United States Patent [19]

Durrnagel

[11] Patent Number: 5,323,705
[45] Date of Patent: Jun. 28, 1994

[54] DEVICE FOR CLEANING THE SOLUTION USED FOR WASHING A PRINTING PRESS CYLINDER

[75] Inventor: Klaus Durrnagel, Taunusstein-Bleidenstadt, Fed. Rep. of Germany

[73] Assignee: MAN Roland Druckmaschinen AG, Fed. Rep. of Germany

[21] Appl. No.: 939,014

[22] Filed: Sep. 2, 1992

[30] Foreign Application Priority Data

Sep. 3, 1991 [DE] Fed. Rep. of Germany ....... 4129189

[51] Int. Cl.$^5$ ............................................. B41F 35/00
[52] U.S. Cl. .................................... 101/424; 101/423
[58] Field of Search ............ 101/424, 423, 425, 424.1, 101/483; 134/109; 355/307

[56] References Cited

U.S. PATENT DOCUMENTS

| | | | |
|---|---|---|---|
| 3,610,260 | 10/1971 | Kearney | 134/109 |
| 4,686,902 | 8/1987 | Allain et al. | 101/424 |
| 4,823,820 | 4/1989 | Larson et al. | 134/109 |
| 5,069,755 | 12/1991 | Durr et al. | 134/109 |
| 5,082,535 | 1/1992 | Oesch et al. | 134/109 |
| 5,109,770 | 5/1992 | Uribe et al. | 101/424 |
| 5,156,173 | 10/1992 | Keyser et al. | 134/109 |

FOREIGN PATENT DOCUMENTS

| | | |
|---|---|---|
| 43624B1 | 6/1981 | European Pat. Off. . |
| 0043624 | 1/1982 | European Pat. Off. . |
| 6948249 | 9/1971 | Fed. Rep. of Germany . |
| WO90/05065 | 5/1990 | World Int. Prop. O. . |

OTHER PUBLICATIONS

07/886,788 May 21, 1992 Durrnagel.

Primary Examiner—Edgar S. Burr
Assistant Examiner—Anthony H. Nguyen
Attorney, Agent, or Firm—Leydig, Voit & Mayer, Ltd.

[57] ABSTRACT

A device for cleaning the solution used for washing a printing press cylinder wherein the washing solution is conveyed in a circuit and cleaned by a distillation device to separate out ink residues followed by a gravity separator to separate the washing solution into its water and solvent constituents. Only small amounts of ink residues are produced in the distillation device and can be disposed of without difficulty as industrial waste. The cleaning procedure is also very efficient because, after being cleaned and separated, the water and solvent constituents of the washing solution can be separately and successively supplied to the cylinder to be washed.

10 Claims, 1 Drawing Sheet

DEVICE FOR CLEANING THE SOLUTION USED FOR WASHING A PRINTING PRESS CYLINDER

FIELD OF THE INVENTION

The present invention relates generally to a device for cleaning the solution used for washing a printing press cylinder and more particularly concerns a device for circulating washing solution containing water and solvent through a distilling device and a gravity separator.

BACKGROUND OF THE INVENTION

A device for supplying cleaning solution to a cylinder washing apparatus of a printing press is described in the applicant's pending application Ser. No. 07/886,788, filed May 21, 1992, now abandoned. Compared with other known washing devices, it is characterized particularly in that the washing solution is conveyed in a circuit and thus reused. Ink residue and dye particles in the used washing liquid are concentrated in the distillation device and can be periodically disposed of without difficulty as industrial waste, and also the amounts of waste are small.

Experiments with the device as described in the applicant's above-mentioned application have shown that the distillate is not homogeneous; instead, water and solvent are produced in succession, depending on the conditions in the distillation device. The distillate is then returned to the actual washing apparatus, but, without further steps, this is troublesome because the distillate, as mentioned, is not a homogeneous mixture of washing solution.

OBJECTS AND SUMMARY OF THE INVENTION

The primary aim of the present invention is to provide a device which cleans the used washing solution, using a distillation device, and also processes the distillate so that it can be returned to the actual washing apparatus and reused to wash the printing press cylinder.

To this end, the present invention is characterized in that the distillation device is followed by a gravity separator which separates the distillate into water and into solvent, which are separately and successively supplied to the inlet of the washing apparatus.

Surprisingly, it has been found that a device having the foregoing features solves the aforementioned problem in a satisfactory manner and also with little extra expense for the apparatus. Thus, the need for emulsifying the distillate is avoided and, instead, the opposite method is followed, i.e., the distillate is separated into its two components. These two separate components of water and solvent are then separately supplied to the actual washing apparatus. Tests have shown that this separate use of the two constituents (water and solvent) results in excellent washing and cleaning of the washing roller for the cylinder of a printing press.

The only apparatus needed is the additional gravity separator, which basically comprises a suitable large volume vessel, in which the two constituents (water and solvent) separate through gravity. They are then discharged into suitable storage containers which are connected to the outlet of the gravity separator.

Preferably the gravity separator is of transparent material (silicate glass or plastic material), so that the separating line between the two constituents is visible and the changeover to the storage container for the respective medium can be made at the separating container outlet as soon as the separating line has moved to the aforementioned outlet. Alternatively the separating container (gravity separator) can be made of other suitable materials such as steel.

In the preferred embodiment, the distillate is supplied to the gravity separator via an intermediate holding container, which to some extent serves as a buffer for the distillate. For similar reasons a drain reservoir for collecting dirty washing solution or agent is advantageously connected in front of the distillation device.

Pursuant to a further aspect of the invention, apparatus for separate application of the two media (water and solvent) to the washing roller is provided wherein separate storage containers for the water and the solvent are connected to the outlet of the gravity separator, and are connected by a control valve to the inlet of the washing device. Preferably, means are also provided for controlling the volumes of washing agent in the collecting containers, so that the entire device operates efficiently.

Another advantage of the invention is that if a multi-color printing press is to be equipped with the cleaning device according to the invention, a single cleaning device is adequate for all the printing mechanisms in the multi-color printing press. Further, the device according to the present invention is particularly suitable for sheet-fed printing presses, because the amounts of washing liquid in this case are appreciably smaller than in web-fed printing presses.

These and other features and advantages of the invention will be more readily apparent upon reading the following description of a preferred exemplified embodiment of the invention and upon reference to the accompanying drawings wherein:

Figure 1:
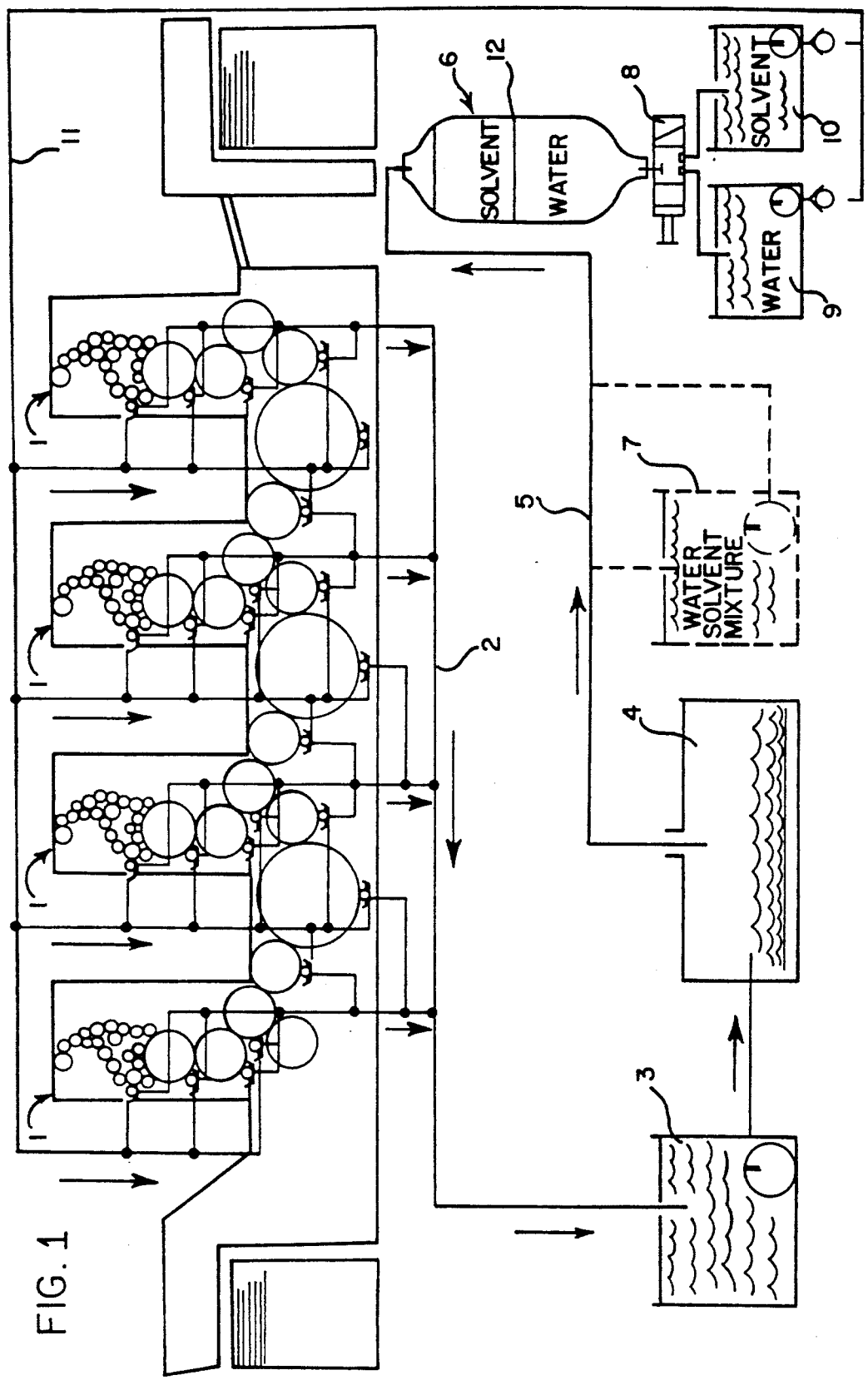
FIG. 1 of the drawing is a somewhat schematic diagram of a multi-color sheet-fed printing press comprising a washing device associated with each printing mechanism, and a device according to the invention for cleaning and separating the circulating washing solution is associated with all the washing devices.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Turning now to FIG. 1, the top part of the drawing shows a multi-color sheet-fed printing press comprising four printing mechanisms each generally indicated at 1. The printing press cylinders are washed by a washing apparatus in a known manner. Preferably, the washing apparatus comprises a washing roller which can be connected to the cylinders for cleaning, and the periphery of which can be supplied with washing solution through a spray nozzle. The washing roller is disposed in a suitable trough with a drain outlet for used washing solution. Details of a washing apparatus of this kind are shown in FIG. 1 of the above-mentioned earlier patent application Ser. No. 07/886,788, filed May 21, 1992.

The drain outlets of the individual washing apparatuses are connected to a common line 2 which opens into a drain reservoir 3 to which a distillation device 4 is connected. The distillate flows through a line 5, either directly to a gravity separator 6 or to an intermediate distillate holding container 7.

A valve 8 is provided at the outlet of the gravity separator 6 and after being separated, the distillate flows through the valve either to a storage container 9 for water or to a storage container 10 for solvent. The storage containers 9 and 10 are connected via non-return valves to a line 11 which returns the purified, separated washing solution to the individual printing mechanisms 1.

Preferably, the gravity separator 6 comprises a transparent vessel of suitable size in which the distillate is separated by gravity into its two constituents, i.e., water and solvent. A visual separating line 12 extends between these two constituents.

It will also be understood that a plurality of 10 pumps and a suitable control means are provided, to ensure efficient operation of the washing device together with the cleaning and separating device.

During operation, dirty washing solution drains into the drain reservoir 3 and then to the distillation device 4, from where the distillate (water and solvent) is supplied either directly or via holding container 7 to the gravity separator 6, where the distillate is separated into the two constituents, after the dirty washing solution has been purified in the distillation device 4. In the distillation device 4, particles of ink, residue and other solid impurities floating in the dirty washing agent are concentrated into a sludge, which has to be periodically discharged as industrial waste. It should be noted and understood that only relatively small amounts of ink sludge need to be discharged. In accordance with usual practice, the distillation device 4 is heated in a suitable manner, so that the solvent and water are distilled and reach the gravity separator 6 as aforementioned.

When the two constituents have separated in the gravity separator, the water, which is heavier, is first discharged into storage container 9 by actuating the valve 8, after which the solvent, which is lighter, is discharged into the solvent storage container 10. The water and the solvent are then successively conveyed from the storage containers 9 and 10, by actuating the associated pumps, into the line 11 and then to the apparatus for washing the printing mechanisms, which are thus cleaned. In the preferred embodiment of the invention, the washing device roller is sprayed with solvent for a few seconds and then with water for a few seconds and so on. As will be apparent to those skilled in the art, the solvent dissolves sticky dirt and ink particles and the water carries them away.

I claim as my invention:

1. A device for cleaning the solution used for washing a printing press cylinder with a washing apparatus including a washing roller, a supply inlet and a drain outlet, said washing apparatus being supplied with said washing solution containing water and solvent, said washing solution cleaning device comprising in combination, means for distilling said used washing solution to separate ink residue from a distillate solution of water and solvent, said distilling means being disposed downstream of said drain outlet of said washing apparatus, gravity separator means disposed downstream of said distilling means for separating said distillate solution from said distilling means into water and solvent constituents and means for separately and successively supplying the water and solvent constituents from said gravity separator means to said supply inlet of said washing apparatus.

2. A device according to claim 1 including an intermediate holding container interposed between said distilling means and said gravity separator means.

3. A device according to claim 1 including a drain reservoir interposed between said drain outlet of said washing apparatus and said distilling means.

4. A device according to claim 1 including separate storage containers for the water and solvent interposed between the gravity separator means and said supply inlet of said washing apparatus.

5. A device according to claim 4 including valve means for controlling the discharge of said water and solvent constituents from said gravity separator means into said separate water and solvent storage containers.

6. A device according to claim 1 wherein said gravity separator means includes a separating chamber having at least a portion thereof made of transparent material for visibly observing the separating line between said water and solvent constituents in said separating chamber.

7. A device for cleaning the solution used for washing a printing press cylinder with a washing apparatus including a washing roller, a supply inlet and a drain outlet, said washing apparatus being supplied with said washing solution containing water and solvent, said washing solution cleaning device comprising in combination, means for distilling said used washing solution to separate ink residue from a distillate solution of water and solvent, a drain reservoir interposed between said drain outlet of said washing apparatus and said distilling means, gravity separator means disposed downstream of said distilling means for separating said distillate solution from said distilling means into water and solvent constituents, an intermediate holding container interposed between said distilling means and said gravity separator means, separate storage containers for said water and solvent constituents interposed between said gravity separator means and said supply inlet of said washing apparatus, and means for separately and successively supplying said water and solvent from said separate storage containers to said supply inlet of said washing apparatus.

8. A device according to claim 7 including valve means for controlling the discharge of said water and solvent constituents from said gravity separator means into said separate water and solvent storage containers.

9. A device according to claim 7 including means for controlling the volumes of washing solution in said drain reservoir, said intermediate holding container and said separate storage containers.

10. A device according to claim 7 wherein said gravity separator means includes a separating chamber having at least a portion thereof made of transparent material for visibly observing the separating line between said water and solvent constituents in said separating chamber.

* * * * *